(12) United States Patent
Hänel

(10) Patent No.: US 9,815,623 B2
(45) Date of Patent: Nov. 14, 2017

(54) STORAGE PRODUCT CARRIER FOR ROLLABLE STORAGE PRODUCTS

(75) Inventor: Joachim Hänel, Bad Friedrichsall (DE)

(73) Assignee: Hänel & Co., Altstätten (CH)

( * ) Notice: Subject to any disclaimer, the term of this patent is extended or adjusted under 35 U.S.C. 154(b) by 185 days.

(21) Appl. No.: 12/937,560

(22) PCT Filed: Apr. 14, 2009

(86) PCT No.: PCT/EP2009/054410
§ 371 (c)(1),
(2), (4) Date: Oct. 13, 2010

(87) PCT Pub. No.: WO2009/127628
PCT Pub. Date: Oct. 22, 2009

(65) Prior Publication Data
US 2011/0033271 A1   Feb. 10, 2011

(30) Foreign Application Priority Data

Apr. 17, 2008   (DE) .................... 20 2008 005 333 U

(51) Int. Cl.
*B65G 1/00* (2006.01)
*B65G 1/02* (2006.01)

(52) U.S. Cl.
CPC ..................... *B65G 1/02* (2013.01)

(58) Field of Classification Search
CPC .................................................. B65G 1/0407
USPC ............... 414/252, 253, 258, 264, 286
See application file for complete search history.

(56) References Cited

U.S. PATENT DOCUMENTS

| 5,331,781 | A | * | 7/1994 | Gilbert | ............................ 52/143 |
| 5,787,817 | A | | 8/1998 | Hei | |
| 6,702,541 | B1 | * | 3/2004 | Lee | ............................... 414/253 |

FOREIGN PATENT DOCUMENTS

| DE | 10 2004 004 959 A | 12/2004 |
| DE | 20 2007 008883 U1 | 9/2007 |
| EP | 0 722 894 A1 | 7/1996 |
| EP | 0 760 411 A1 | 3/1997 |
| WO | 9627063 A | 9/1996 |

(Continued)

OTHER PUBLICATIONS

International Search Report and Written Opinion for PCT/EP2009/054410, dated Nov. 18, 2010, 8 pages.

(Continued)

*Primary Examiner* — Saul Rodriguez
*Assistant Examiner* — Willie Berry, Jr.
(74) *Attorney, Agent, or Firm* — Thomas B. Ryan, Patent Agent; Harter Secrest & Emery LLP

(57) ABSTRACT

The invention relates to a storage product carrier (10) for a storage rack (100) that includes a plurality of support beams disposed one on top of the other at a distance from one another, the support beams being arranged in pairs on opposite side walls of the storage rack (100) and supporting the storage product carrier (10), wherein the storage product carrier (10) comprises a base plate (30) for storing a rollable storage product container (20) provided with at least one wheel (22), wherein the base plate (30) has at least one depression (40) for receiving the wheel (22) of the storage product container (20). The invention further relates to a storage rack with such a storage product carrier.

12 Claims, 6 Drawing Sheets

(56) References Cited

FOREIGN PATENT DOCUMENTS

WO         9958408  A    11/1999
WO      2008136043  A    12/2006

OTHER PUBLICATIONS

International Search Report for PCT/EP2009/054410, dated Jul. 15, 2009, 3 pages.

* cited by examiner

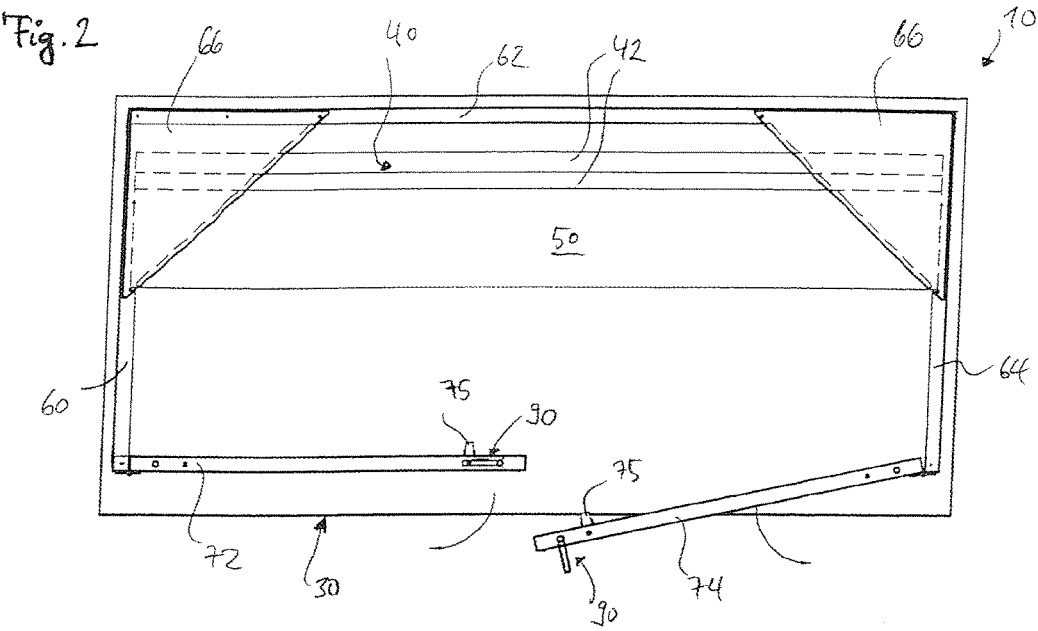
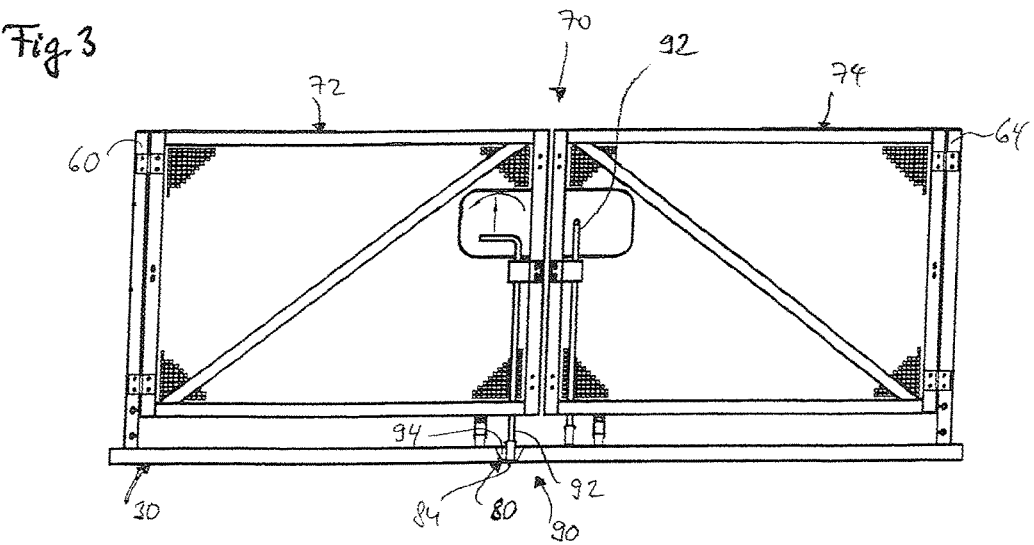

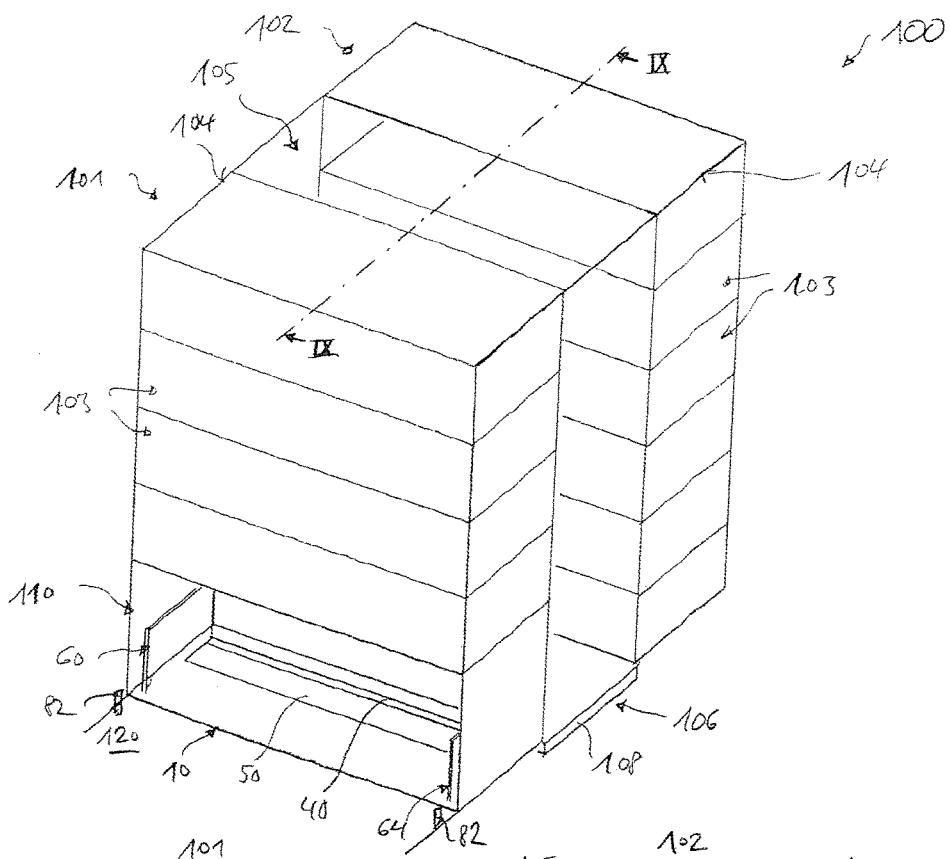
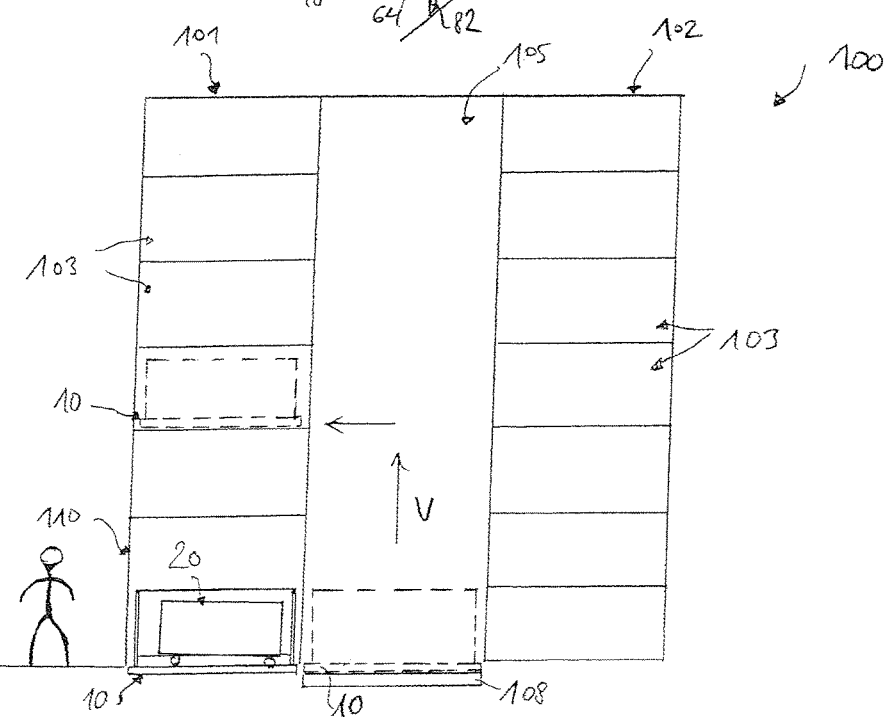

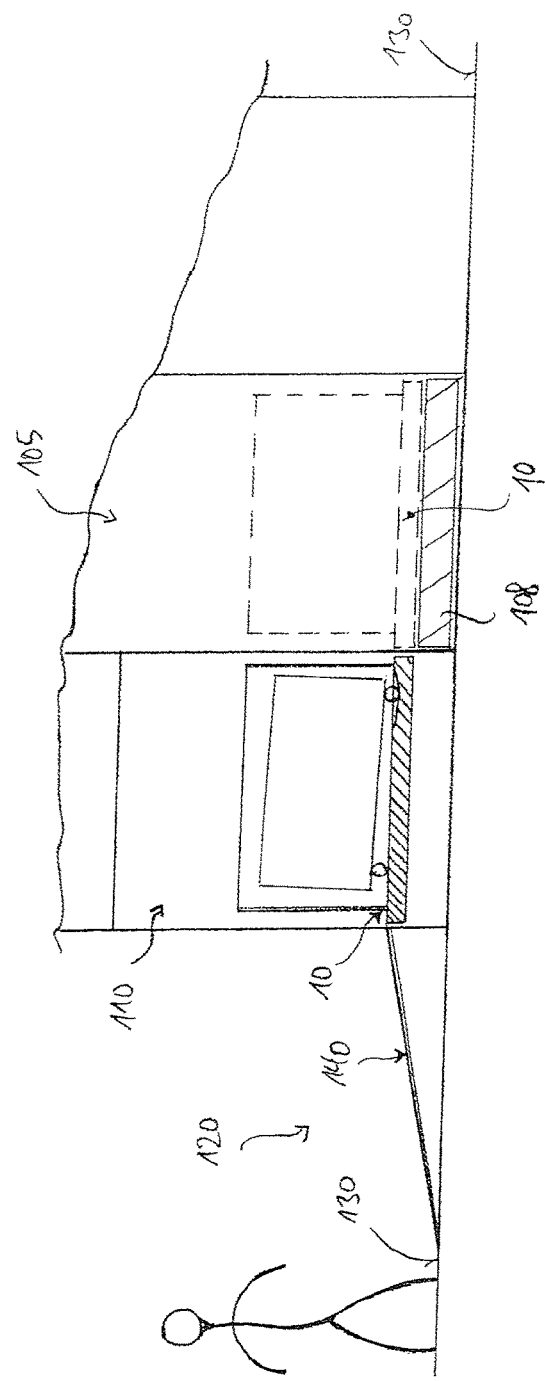

STORAGE PRODUCT CARRIER FOR ROLLABLE STORAGE PRODUCTS

The present invention relates to a storage product carrier for a storage rack that includes a plurality of support beams disposed one on top of the other at a distance from one another, said support beams being arranged in pairs on opposite side walls of the storage rack and supporting the storage product carrier, wherein the storage product carrier comprises a base plate for storing a rollable storage product container provided with at least one wheel.

Such storage product carriers are used, in particular, for the storage of storage products in automated vertical lifts, which include a transport apparatus for the storage product carrier. Since the arrangement in the storage rack is dependent on the height of the storage product, storage products of various sizes can be stored on the storage product carriers in a space-saving manner.

Such a vertical lift is known from EP 0 722 894 A1. To support the storage product carriers, carrier supports are provided in this storage rack in the side walls formed and made of steel sheeting, which support the storage product carriers. Furthermore it is provided that the storage spaces are assigned to the storage product carriers dependent on the height of the storage product.

It is therefore the object of the present invention to create a storage product carrier and a storage rack wherein the rollable storage product container can be safely stored and retrieved.

To achieve this object, it is suggested in accordance with claim 1, that the base plate comprises at least one depression for holding the wheel of the storage product container.

The depression forms a kind of trough, bead, channel, or groove that has sufficient depth so that the wheel of the storage product container remains in the depression both in a resting state and during conveyance of the storage product carrier within a storage rack, and thus the storage product container is retained in its storage position.

The storage product container rollable on the base plate comprises at least one wheel. Preferably it is a rolling cart or setup cart provided with four wheels.

With the configuration according to the present invention, the rollable storage product container can be pushed for storage in a storage rack by an operator in a simple manner with little force expenditure onto the base plate, until the at least one wheel of the storage product container is received in the depression and is engaged in the depression. This engagement of the wheel enables secure retention of the storage product container on the storage product carrier, in particular, during movement of the storage product carrier within the storage rack. Furthermore, certain surface areas of the base plate can be predefined as storage spaces.

In a preferred embodiment, the depression is formed by at least one surface inclined with respect to the horizontal. As a consequence of the inclined surface, the storage product carrier can be easily moved by an operator even in the case of relatively great weight and/or dimensions. Advantageously, the depression is formed in correspondence to the diameter of the wheel and/or the weight of the storage product container. The depression can also be formed by a plurality of such inclined surfaces as seen in cross-section, and/or by at least one horizontal surface and/or by means of at least one vertical surface.

To further simplify the storage and retrieval of the rollable storage product carrier, the base plate can have a storage surface section advantageously inclined with respect to the horizontal. Preferably, the inclined storage surface section is adjacent to the depression. As a consequence of this inclined area, the force expenditure required for rolling the storage product container can be reduced, and the storage product container basically rolls toward the depression automatically until the wheel is received within the depression and is in engagement with it. Such an inclination similarly simplifies withdrawal of the wheel of the storage product container from the depression across the inclined storage surface section and then from the base plate. For example, the inclined storage surface section can extend from about the center axis of the base plate to the depression. In principle, the entire surface area of the base plate can also have an inclined configuration.

In a further advantageous embodiment, a plurality of depressions are provided spaced along one direction with respect to each other, or arranged along essentially parallel-extending directions. In this manner, storage spaces can be assigned to predetermined areas of the base plate and/or a plurality of rows of storage product containers can be stored on the base plate.

In an advantageous embodiment, the at least one depression and/or the at least one storage surface section are formed as an exchangeable unit. Advantageously, the unit comprises the depression and the inclined storage surface section and optionally further surface sections of the base plate, and is attachable to the base plate. To attach the unit, the base plate can have a substructure and support structure suitable for a plurality of units. In this way, a preconstructed unit with depressions geometrically adapted to the wheels of the storage product container can be attached to the substructure and the support structure depending on the type of the storage product container to be stored. By these means the storage product carrier and in particular its base plate can be adapted to the weight and size of each of the storage product containers and storage products.

In a further advantageous embodiment, the depression extends along one side of the base plate and is spaced from a side edge of the base plate. For example, with a rectangular shape of the base plate, the depression can extend along one long side and at a distance from the outermost edge of the long side. Preferably, the distance of the depression from a side edge is chosen in correspondence to the geometry of the base plate and/or the storage product container. Preferably, the depression essentially extends along the length of one of the sides of the base plate. In a rectangular configuration of the base plate, for example, the depression can extend essentially over the entire length of the long side.

As a securing measure for the storage product to be stored on the storage product carrier, it can be advantageously provided to fix a side wall along at least one side of the base plate. Advantageously, one side wall is attached along each of three sides of the base plate. By these means, the storage product container can be pushed from a service area onto the base plate and from the base plate into the service area via the fourth side, if the base plate has a rectangular configuration.

The side wall or the side walls can at the same time prevent that a storage product with excessive dimensions is stored in the storage product container so that the storage product protrudes beyond the storage product container. In other words, the side wall, or the plurality of side walls can serve as a protrusion control means. Additionally, the side walls can be stiffened by means of a plate or a beam. Preferably, a triangular plate is used, which is attached to two neighboring side walls. For the case where this triangular plate is mounted in a corner area of two side walls on the two top sides of the side walls, so that a protruding storage product abuts against the plate as the storage product container is pushed onto the base plate, it is signaled to the operator that the storage product or the storage product container is not suitable.

To arrange the handover area of the storage product carrier as a closable configuration, a door with at least one door leaf is present on one side of the base plate. By these means the storage product container can be transferred from the service area onto the base plate while the door leaf is open and subsequently the door leaf can be brought into its closed position. To simplify movement of the door leaf, it can be provided with a wheel.

To effectively prevent accidents, advantageously, a monitoring means is provided that checks whether the door is in the open or closed state. A light barrier and/or a switch can be provided, for example, as a monitoring means. The light barrier, in particular, serves to prevent that movement of the storage product container begins before the door is completely closed.

The above-mentioned switch can monitor, in particular, a closure means for the door. In a preferred embodiment, both the light barrier and the switch are provided.

In a further preferred embodiment, the closure means comprises a latch and a socket, wherein the latch engages the socket in a closed position of the door, and wherein the latch is out of engagement with the socket in an open position of the door. Advantageously, the door has a two-leaf configuration and comprises such a closure means for each of the door leafs.

The latch, which locks the one or more door leafs, in a preferred embodiment, has a coded security switch at the lower end. The counterpart thereof is at the corresponding position at each lift retrieval point. Prior to each lift start, it is enquired whether the latch is locked, and the lift is only enabled after this. It is thus ensured that the storage product carrier is only moved while the door is closed. An autonomous opening of the latch is not possible.

To achieve the above-mentioned object, a storage rack is suggested, which is provided with a plurality of support beams, one on top of the other at a distance from one another, arranged in pairs on opposite side walls, and wherein at least one storage product carrier is provided according to the present invention. Such a storage rack utilizes the advantages of the storage product carrier according to the present invention.

In an advantageous embodiment, a controllable transport apparatus is provided for storing and retrieving the storage product carrier in or from the storage rack. Such a transport apparatus is preferably fully automatically operated and can comprise a transport unit traversable in the horizontal and/or in the vertical direction for storing and retrieving the storage product carriers.

In a further advantageous embodiment, at least one service opening is provided for storing and retrieving the storage product carrier in and from the storage rack, wherein the storage product containers are rollable from a service area through the service opening onto the base plate and vice versa.

Furthermore, the service area can be provided with a monitoring means and the storage product carrier with a door, wherein the monitoring means checks whether the door is in the opened or closed state. The monitoring means can thus comprise a light barrier that only transmits an enable signal to the motor unit of the storage rack when the door is completely closed.

The invention will be explained in the following with reference to the drawings in more detail, wherein:

FIG. 2 is a plan view of the storage product carrier according to claim 1;

FIG. 3 is a side view of the storage product carrier according to claim 1;

FIG. 8 is a perspective view of a storage rack with a storage product carrier according to FIGS. 1 to 5;

FIG. 9 is a cross-sectional view along line IX-IX of the storage rack according to FIG. 8;

FIG. 10 is a cross-sectional view of an alternative embodiment of the lower region of the storage rack according to FIGS. 8 and 9;

Figure 1:
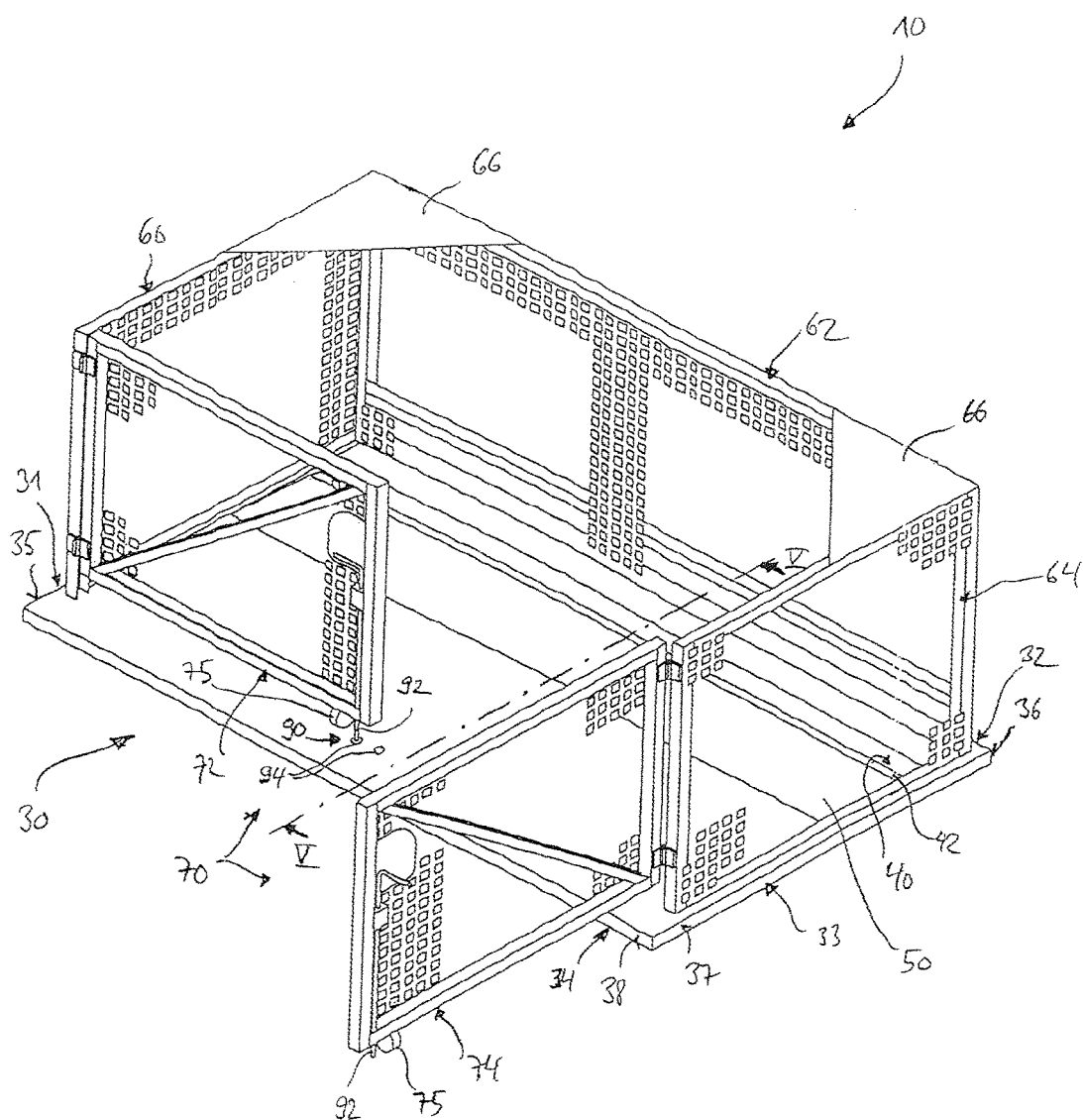
FIG. 1 is a perspective view of the storage product carrier according to the present invention.

FIG. 1 schematically shows the structure of a storage product carrier 10 according to the present invention, having a base plate 30 for the storage of a storage product container 20 in the form of a rolling cart provided with four wheels 22.

Base plate 30, as viewed from above, has a rectangular configuration and has four sides 31, 32, 33, 34, each with associated side edges 35, 36, 37 and 38. As shown in FIG. 1, sides 31 and 33 are the short sides and sides 32 and 34 are the long sides of the rectangle. In the area of each of sides 31, 32 and 33, a side wall 60, 62 and 64 extends at a right angle to the base plate. As can be seen in FIG. 1, side walls 60, 62 and 64 are positioned at a short distance to side edges 35 to 38. As an alternative, side walls 60, 62, 64 can also be flush with side edges 35 to 38. Side walls 60 and 62, and side walls 62 and 64 are respectively stiffened by a triangular plate 66, respectively mounted at the top sides of side walls 60, 62, 64. These plates 66 can at the same time prevent that a storage product with excessive dimensions is present in the storage product container so that the storage product protrudes beyond the storage product container. Side walls 60, 62, 64 can also fulfill this function. In other words, side walls 60, 62, 64 and/or plates 66 can serve as protrusion control means.

In the area of side 34, there is a door 70 having two door leafs 72 and 74, linked to side wall 60, 64 via respective hinges and which thus enable opening and closing of door 70. To move door leafs 72, 74 more easily from the open position to the closed position, each of the door leafs is provided with a wheel 75.

Figure 4:
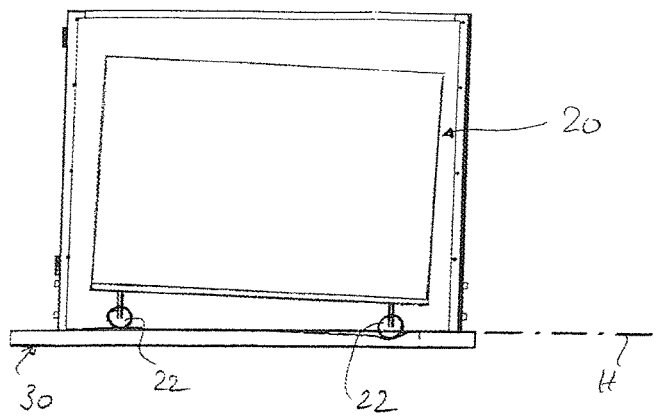
FIG. 4 is a further side view of the storage product carrier according to claim 1.
Figure 5:
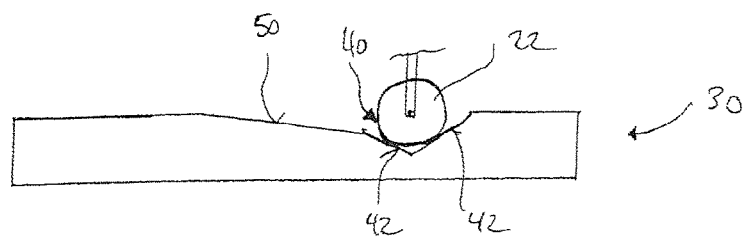
FIG. 5 is a cross-sectional view along line V-V in FIG. 1 of the base plate of the storage product carrier with a depression.
Figure 6:
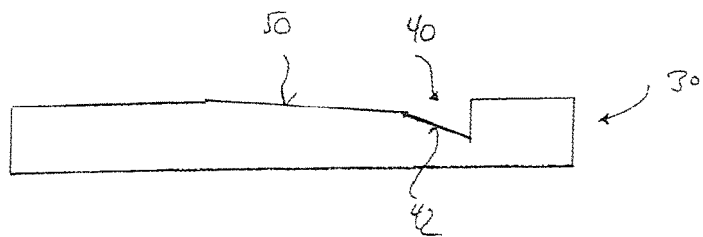
FIG. 6 is a further embodiment of the depression of the base plate as an alternative to the one in FIG. 5.
Figure 7:
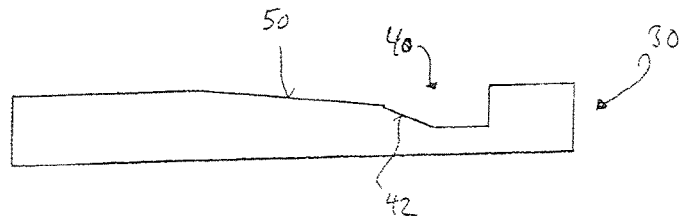
FIG. 7 is a further embodiment of the depression of the base plate as an alternative to the one in FIG. 5.

As can be seen from a combination of FIGS. 1, 2, 4 and 5, base plate 30 has at least one depression 40 for receiving at least one wheel 22. As can be seen in FIGS. 4 and 5, in particular, depression 40 is formed, as seen in cross-section, by two surfaces 42 inclined with respect to the horizontal H. In principle, depression 40 has at least one such inclined surface 42 (cf. FIG. 6) and can also comprise at least one vertical and/or horizontal surface (cf. FIG. 7).

With reference to the first embodiment according to FIGS. 1 to 5, depression 40 extends along side 32, spaced from edge 36 and essentially extends over the entire length of side 32.

Depression 40 forms a kind of trough, bead, channel or groove and has a sufficient depth so that at least one wheel 22 is retained in depression 40 both in the rest state and during movement of storage product carrier 10 within a storage rack, and thus storage product container 20 is held in its storage position.

To enable easy delivery of storage product container 20 into the storage position predefined by depression 40, and also simple removal of storage product container 20 from the storage position and from base plate 30, base plate 30 has a storage surface section 50 inclined with respect to the horizontal H. In the exemplary embodiment according to FIGS. 1 to 5, storage surface section 50 is directly adjacent to depression 40 and preferably has a lesser inclination relative to the horizontal H than inclined surface 42. Furthermore, storage surface section 50 extends along side 32 over a length corresponding to depression 40, and as seen in the direction of sides 31, 33 it extends over a width that is less than half the length of side edge 35, 37. In alternative embodiments, a plurality of storage surface sections 50 with various different angles of inclination can also be configured and can also be arranged at a distance to depression 40.

FIGS. 8 and 9 are a perspective view and a cross-sectional view of a storage rack 100 for storing a plurality of storage product carriers 10 according to FIGS. 1 to 5. Storage rack 100 comprises two rack units 101, 102, spaced by means of a transport shaft 105. A plurality of storage spaces 103 is provided in each rack unit 101, 102. To form storage spaces 103 in rack unit 101, 102, a plurality of support beams arranged one above the other in a spaced relationship are provided in pairs on opposite side walls 104. Storage product carriers 10 are supported on these support beams.

Rack unit 101 further comprises a service opening 110, which is configured in such a manner that storage product containers 20 can be transferred or, in particular, rolled by the operator from a service area 120 situated in front of storage rack 100 in one plane onto storage product carrier 10 provided in the area of service opening 110. To transfer storage product carrier 10 from service opening 110 into transport shaft 105, the transport apparatus comprises a first horizontally traversable transport unit 108. This first transport unit 108 is also referred to as an extractor. Furthermore, the transport apparatus comprises a second transport unit traversable in transport shaft 105 in a vertical direction V.

FIG. 9 shows a situation in which a storage product container 20 has already been rolled by the operator through service opening 110 onto storage product carrier 10 to be stored in storage rack 100. For this purpose storage product container 20 is pushed by the operator from service area 120 onto base plate 30 and across inclined storage surface section 50 onto storage product carrier 10 up to a point where two wheels 22, for example, are received in depression 40 (cf. FIG. 4). This movement is promoted by the inclination of storage surface section 50 toward depression 40, so that storage product container 10 essentially rolls automatically into depression 40.

Subsequently, the operator moves the two door leafs 72 and 74 into the closed position and operates a closure means 90, which comprises a latch 92 and a socket 94. Latch 92 is adjustable from an unlatched position into a latched position according to the arrows indicated in FIG. 3. Socket 94 is formed by a recess in base plate 30. In the closed position of door 70, latch 92 engages socket 94, whereas latch 92 is out of engagement with socket 94 in an open position of door 70.

To ensure proper closing of the two door leafs 72, 74 before storage product carrier 10 is moved, a monitoring means 80 is provided, which checks whether door 70, or door leafs 72, 74, are in the opened or closed position. To realize this, socket 94 can be provided with an associated switch 84 which checks whether or not latch 2 properly engages socket 94.

A corresponding counterpart to switch 84 is provided at the lower end of latch 92.

Furthermore, another socket or bore can be provided in the area of service opening 120, which can also be referred to as the retrieval station, into which latch 92 comes into engagement in the open position of the door. This further socket and/or the lower end of latch 92 can also be provided alternatively or additionally to the above explained monitoring means 80, with a switch or a switch contact, so that the transport apparatus 106 of storage rack 100 is not set in motion as long as latch 92 is present within the other socket. In other words, at least one monitoring means 80 can be provided, which is associated with storage product carrier 10 and/or with service area 120.

Additionally or alternatively a light barrier 82 can be provided, which is arranged in service area 120 and monitors whether door 70 or leafs 72, 74 are in the opened or closed position (cf. FIG. 8).

Furthermore, storage product carrier 10 is indicated by dashed lines in FIG. 9 in its later position on transport unit 108. Transport unit 108 is thus equipped in a manner suitable to transport storage product carrier 10 from service opening 110 into the area of transport shaft 105 on transport apparatus 106.

Subsequently, storage product carrier 10 is transported along the vertical direction V to the height of an assigned storage space 103 and finally pushed in the horizontal direction into the storage space 103 by means of transport unit 108 (see the upper position of storage product carrier 10 indicated by a dashed line in FIG. 9).

Storage rack 100 can be provided with a control unit for automatically determining a suitable storage space 103 for a storage product carrier 10 to be stored and for driving and traversing transport apparatus 106 accordingly.

For the retrieval of a storage product carrier 10, the operator can request the desired storage product container 20 or storage product carrier 10 by means of an input unit provided in the area of service opening 110. After the control unit has determined the storage space 103, the associated storage product container 20 or storage product carrier 10, the associated storage product carrier 10 is moved into the area of service opening 110 so that the top of base plate 30 is essentially at the same height as the surface of service area 120. Thereafter, storage product container 20 can be rolled out of its storage position with wheels 22 received in depression 40, out of depression 40 across inclined storage surface section 50 from base plate 30 and into service area 120 and subsequently moved to the desired target location.

FIG. 10 shows an alternative embodiment of the lower area of storage rack 100 according to FIGS. 8 and 9. With reference to FIG. 10, storage rack 100 is installed on a floor surface 130 of a store room. Storage product carrier 10 is in service opening 110 in the situation shown in FIG. 10. Furthermore, storage product carrier 10 is indicated with dashed lines in its later position situated on transport unit 108. To be able to convey storage product carrier 10 from service area 120 into the elevated area of service opening 110, a ramp 140 is provided. In the exemplary embodiment shown according to FIG. 10, the height difference between the top of floor surface 130 and the top of the placement surface for storage product carrier 10 in the area of service opening 110 is about 535 mm. This height difference can also be greater or smaller depending on the construction. In comparison, the variant of storage rack 100 shown in FIGS. 8 and 9 is installed in a recess or trench in the store floor or the floor surface 130.

Figure 11:
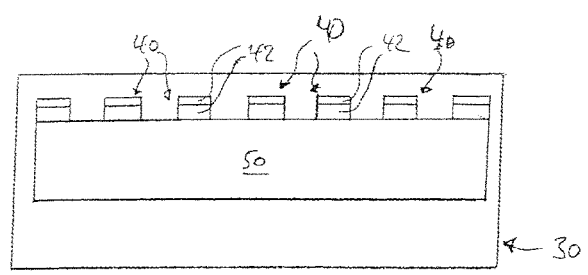
FIG. 11 is a plan view of a further embodiment of the base plate with a plurality of depressions.
Figure 12:
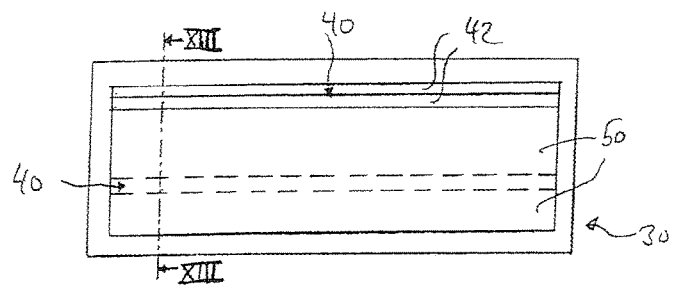
FIG. 12 is a plan view of a further embodiment of the base plate with a plurality of depressions.
Figure 13:
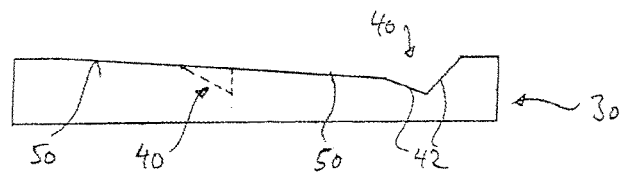
FIG. 13 is a cross-sectional view along line XII-XII in FIG. 12.

Finally, FIGS. 11 to 13 show further exemplary embodiments of storage product carrier 10 with variants as regards the configuration of depression 40.

A plurality of depressions 40 are provided in FIG. 11, extending in a direction parallel to side 32 and spaced with respect to each other. In such an arrangement, storage spaces can be defined in a manner adapted to the spacing of the wheels 22 of each storage product container 20.

FIGS. 12 and 13 show an embodiment having two depressions 40 arranged in parallel to each other and two side edges 36 and 38. The depression is configured as shown in FIG. 5 at a distance to side 32. Depression 40 indicated with a dashed line can also be formed as needed by means of a pivotable section of base plate 30. The pivotable section is pivotable about a horizontal axis out of the plane of the inclined storage surface section 50 in a downward direction, so that, in the downwardly pivoted position of the section, the second depression 40 is formed. By these means it is possible to first deliver a plurality of storage product containers 20 across the area of the depression 40 at the back, not yet downwardly pivoted, and subsequently, should the need for further storage arise and after lowering the pivotable base plate section, to roll a second row of storage product containers 20 with their associated wheels 22 into the further depression 40.

In a preferred embodiment, depression 40 and/or storage surface section 50 can be provided by means of an exchangeable unit or a module. By these means, depending on the configuration of the at least one wheel 22 or of storage product container 20, the top surface of base plate 30 can be configured with one or more correspondingly formed depressions 40 and associated storage surface sections 50.

This unit can be mounted on a corresponding substructure or support structure of base plate 30 in a simple manner.

The described storage product carrier 10 has the advantage, in particular, that depression 40 ensures secure retention of storage product containers 20 on storage product carrier 10. Furthermore, the retrieval and delivery operation to be carried out by the operator is facilitated by inclined surface 42 of depression 40 and the optionally present inclined storage surface section 50.

Furthermore, a predetermined storage space is predefined to the operator by the depression 40. Furthermore, storage product carrier 10 can be easily adapted to various storage product containers 20 with different weight and/or different wheels 22.

LIST OF REFERENCE SIGNS 10 storage product carrier
20 storage product container
22 wheel
30 base plate
31 side
32 side
33 side
34 side
35 side edge
36 side edge
37 side edge
38 side edge
40 depression
42 inclined surface
50 storage surface section
60 side wall
62 side wall
64 side wall
66 plate
70 door
72 door leaf
74 door leaf
75 wheel
80 monitoring means
82 light barrier
84 switch
90 closure means
92 latch
94 socket
100 storage rack
101 rack unit
102 rack unit
103 storage space
104 side wall
105 transport shaft
106 transport apparatus
108 transport unit
110 service opening
120 service area
130 floor surface
140 ramp
H horizontal
V vertical

The invention claimed is:

1. A product carrier system for storing products in storage spaces of a storage rack having a rack unit containing the storage spaces and a transport shaft within which a transport unit is movable between the storage spaces of the rack unit comprising:
    a storage product carrier having a base plate,
    a rollable storage product container for containing products and having at least one wheel,
    the storage product carrier being arranged to be stored in and separately supported by individual storage spaces of the storage rack,
    the storage product carrier supporting the rollable storage product container for rolling across a surface of the base plate,
    the storage product carrier being transportable together with the rollable storage product container by the transport unit within the transport shaft between the storage spaces of the rack unit, and the storage product carrier being transportable together with the rollable storage product container by the transport unit from the transport shaft into one of the storage spaces of the rack unit,
    the base plate having sides and at least one fixed depression in the surface of the base plate for receiving the wheel of the storage product container as the wheel of the rollable storage product container is rolled across the base plate,
    the depression having in cross section one or more surfaces inclined to a horizontal direction and extending essentially along the length of one of the sides of the base plate traverse to the direction in which the rollable storage product container is rollable across the base plate, the wheel of the rollable storage product container being rollable down one of the inclined surfaces toward a bottom of the depression to hold the rollable storage product container in a storage position on the storage product carrier, the base plate including an inclined storage surface section that is inclined toward the depression so that as the rollable storage product container is rolled across the surface of the base plate, the wheel of the rollable storage product container rolls down the inclined storage surface section toward the depression, the base plate including a generally horizontally oriented surface section adjacent to the inclined surface section and along which the rollable storage product container is rollable across the base plate, the depression being formed in the base plate by at least one surface that is adjacent to the inclined surface section and is inclined with respect to the generally horizontally oriented surface section of the base plate by an amount that is more than an amount that the inclined storage surface section is inclined to the generally horizontally oriented surface section, the inclined storage surface section extending along the depression through a length corresponding to a length of the depression, and the depression extending along one side of the base plate at a distance to a side edge of the base plate.

2. The product carrier system according to claim 1, wherein the inclined storage surface section is one of a plurality of inclined surfaces sections formed in the base plate having different angles of inclination with respect to the generally horizontally oriented surface section.

3. The product carrier system according to claim 1, wherein the at least one fixed depression in the surface of the base plate comprises a plurality of depressions that are spaced with respect to each other along one direction, or arranged along essentially parallel-extending directions.

4. The storage product carrier system according to claim 1, wherein at least one of (a) the at least one fixed depression in the surface of the base plate and (b) the inclined storage surface section is formed by an exchangeable unit.

5. The product carrier system according to claim 1, wherein a side wall is fixed along at least one of the sides of the base plate.

6. The product carrier system according to claim 1, wherein a door having at least one door leaf is present along one of the sides of the base plate.

7. The product carrier system according to claim 6, wherein a monitoring means is provided, which checks whether the door is in the opened or closed state, wherein the monitoring means comprises a switch, which monitors a closure means of the door.

8. The product carrier system according to claim 7, wherein the closure means comprises a latch and a socket, wherein the latch comes into engagement in the socket in a closed position of the door and wherein the latch is out of engagement with the socket in an open position of the door.

9. The product carrier system according to claim 1 wherein the storage rack includes a plurality of support beams disposed one on top of the other at a distance from one another and arranged in pairs on opposite side walls, and the storage product carrier is supported on one of the beam pairs on the opposite side walls.

10. The product carrier system according to claim 9 wherein the storage rack includes at least one service opening for storing and retrieving the storage product carrier into and from the storage rack, wherein the storage product containers are rollable from a service area through the service opening onto the base plate and vice versa.

11. The product carrier system according claim 10, wherein the service area is provided with a monitoring means and the storage product carrier is provided with a door, wherein the monitoring means checks whether the door is in the opened or closed state.

12. The product carrier system according to claim 1, wherein one side wall is attached along each of three of the sides of the base plate.

* * * * *